(12) United States Patent
Zhang et al.

(10) Patent No.: US 10,033,636 B1
(45) Date of Patent: Jul. 24, 2018

(54) ETHERNET SEGMENT AWARE MAC ADDRESS LEARNING

(71) Applicant: CISCO TECHNOLOGY, INC., San Jose, CA (US)

(72) Inventors: Mei Zhang, Raleigh, NC (US); Yushun Zhang, Cary, NC (US); Ali Sajassi, San Ramon, CA (US); Thomas Eric Ryle, Raleigh, NC (US); Richard Thomas Wood, Durham, NC (US); Nathan Allen Mitchell, Silver City, NC (US)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 15/098,862

(22) Filed: Apr. 14, 2016

(51) Int. Cl.
*H04L 12/28* (2006.01)
*H04L 12/741* (2013.01)
*H04L 12/721* (2013.01)
*H04L 12/46* (2006.01)

(52) U.S. Cl.
CPC .......... *H04L 45/74* (2013.01); *H04L 12/4633* (2013.01); *H04L 12/4641* (2013.01); *H04L 45/66* (2013.01)

(58) Field of Classification Search
CPC ..... H04L 45/74; H04L 12/4633; H04L 45/66; H04L 12/4641
USPC ........................................................ 370/392
See application file for complete search history.

(56) References Cited

U.S. PATENT DOCUMENTS

| 2007/0086361 | A1* | 4/2007 | Allan | H04L 12/462 370/254 |
| 2008/0159291 | A1* | 7/2008 | Sultan | H04L 12/4641 370/392 |
| 2010/0080238 | A1* | 4/2010 | Allan | H04L 12/4662 370/401 |
| 2011/0188509 | A1* | 8/2011 | Kern | H04L 12/4658 370/408 |
| 2011/0310904 | A1* | 12/2011 | Gero | H04L 12/4625 370/401 |
| 2013/0235876 | A1 | 9/2013 | Sajassi et al. | |
| 2015/0003450 | A1 | 1/2015 | Salam et al. | |
| 2015/0071080 | A1 | 3/2015 | Sajassi et al. | |

OTHER PUBLICATIONS

Sajassi et al., Provider Backbone Bridging Combined with Ethernet VPN (PBB-EVPN), Internet Working Group, May 14, 2015.*

(Continued)

*Primary Examiner* — Mang Yeung

(57) ABSTRACT

A computer-implemented method for assisting Ethernet Segment (ES)-aware media access control (MAC) address learning is disclosed. The method includes receiving, at a provider edge (PE) device, a data packet from a core network, the data packet identifying an ES from which the data packet originated and identifying a MAC address as a source MAC address; determining whether the PE device has an Ethernet connection in the ES identified by the data packet; and, upon positive determination, associating the MAC address identified as the source MAC address of the data packet to a bridge port, at the PE device, of the Ethernet connection in the ES identified by the data packet.

20 Claims, 14 Drawing Sheets

(56) References Cited

OTHER PUBLICATIONS

U.S. Appl. No. 15/098,823, filed Apr. 14, 2016, entitled "PBB-EVPN Customer MAC Synchronization Among All-Active Multi-Homing PES," Inventors: Zhang, et al.
"Ethernet VPN (EVPN) and Provider Backbone Bridging-EVPN: Next Generation Solutions for MPLS-based Ethernet Services," © 2014 Cisco White Paper, May 2014, 10 pages.
Sajassi, et al., "Provider Backbone Bridging Combined with Ethernet VPN (PBB-EVPN)," Internet Working Group, May 14, 2015, 22 pages.
Sajassi, et al, "BGP MPLS-Based Ethernet VPN," Internet Engineering Task Force (IETF), RFC 7432, Feb. 2015, 56 pages.
Ericsson, "Ericsson First With Key 5G Advances" Press Release, Feb. 25, 2015, 4 pages.

* cited by examiner

ETHERNET SEGMENT AWARE MAC ADDRESS LEARNING

TECHNICAL FIELD

This disclosure relates in general to the field of communications and, more particularly, to methods and systems for reducing movement of a MAC address between bridge ports of a network device.

BACKGROUND

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

Ethernet VPN (EVPN) and Provider Backbone Bridging EVPN (PBB-EVPN) are next generation solutions that provide Ethernet multipoint services over Multi-Protocol Label Switching (MPLS) networks. EVPN and PBB-EVPN are members of the family of EVPN technologies, which encompasses next generation Ethernet L2VPN solutions that use Border Gateway Protocol (BGP) as control-plane for MAC address signaling/learning over the core as well as for access topology and VPN endpoint discovery. The introduction of EVPN marks a significant milestone for the industry, as it aligns the well-understood technical and operational principles of IP VPNs to Ethernet services. Operators are now able to leverage their experience and the scalability characteristics inherent to IP VPNs for their Ethernet offerings. Further improvements with respect to the functionality of PBB-EVPN are always desirable.

BRIEF DESCRIPTION OF THE DRAWINGS

To provide a more complete understanding of the present disclosure and features and advantages thereof, reference is made to the following description, taken in conjunction with the accompanying FIGUREs, wherein like reference numerals represent like parts, in which.

DETAILED DESCRIPTION OF EXAMPLE EMBODIMENTS

Overview

Figure 1:
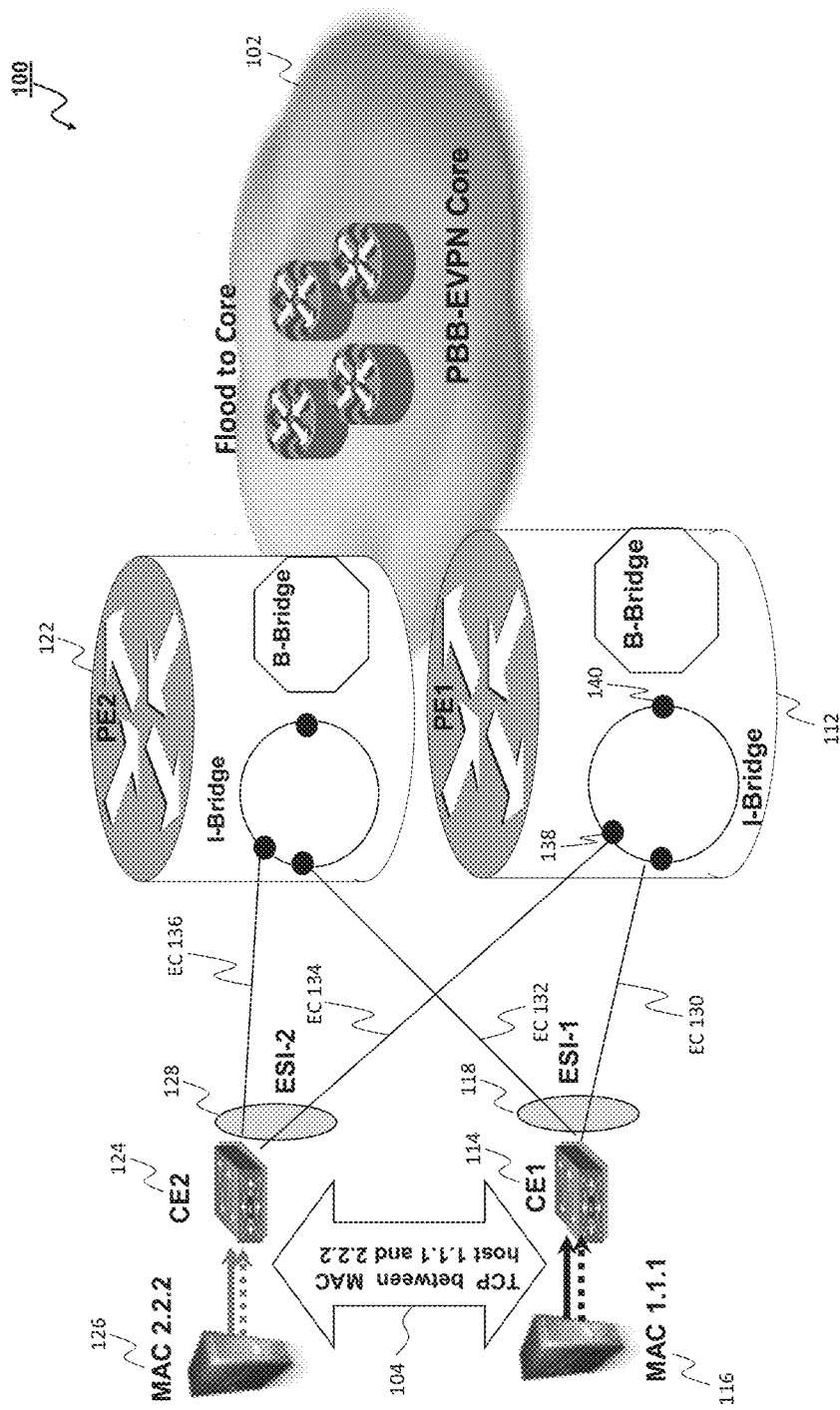
FIG. 1 illustrates a schematic block diagram of an example network environment of a service provider network, according to some embodiments of the present disclosure.

Various embodiments of the present disclosure operate in the context of Provider Backbone Bridging combined with Ethernet VPN (PBB-EVPN), which recently has gained acceptance as a next generation Layer 2 VPN (L2VPN) network technology. In a PBB-EVPN network, Customer MAC (C-MAC) addresses should be learned on Provider Edge (PE) devices that are actively involved in forwarding traffic to, or from, these addresses.

In one aspect, embodiments presented herein relate to a computer-implemented method for assisting learning of C-MAC addresses on PE devices. The method includes receiving, at a first provider edge (PE) device (in the exemplary embodiments shown in the FIGUREs indicated as "PE1"), a data packet from a core network, the data packet identifying an Ethernet Segment (ES) from which the data packet originated and identifying a first media access control (MAC) address (in the exemplary embodiments shown in the FIGUREs indicated as "MAC 1.1.1") as the destination MAC address. The method further includes determining, at the first PE device, whether the first PE device has an Ethernet connection in the ES identified by the data packet (i.e. whether the first PE device has a local connection to the originating ES identified in the received data packet) and whether the first PE device has learned the first MAC address. Upon positive determination (i.e. when both the identified ES is local to PE1 and PE1 has learned MAC 1.1.1), the method includes the first PE device sending an announcement message to the core network, the announcement message (e.g. as a MAC announcement frame) identifying the first MAC address (MAC 1.1.1).

In another aspect, embodiments presented herein relate to a computer-implemented method for reducing movement of a MAC address between bridge ports of a PE device by implementing Ethernet Segment (ES)-aware MAC address learning. The method includes receiving, at a PE device, a data packet from a core network, the data packet identifying an ES from which the data packet originated and identifying a MAC address as a source MAC address; determining, at the PE device, whether the PE device has an Ethernet connection in the ES identified by the data packet; and, upon positive determination, associating, for traffic forwarding purposes, the MAC address identified as the source MAC address of the data packet to a bridge port, of the PE device (i.e. local bridge port), of the Ethernet connection in the ES identified by the data packet.

For the embodiments of the methods described herein that involve announcing MAC addresses and for the embodiments of the methods described herein that involve reducing movement of a MAC address between bridge ports, a functional entity performing embodiments of these methods will be referred to in the following as a "MAC learning processing system" (where the word "system" does not imply or limit its implementation to a system). Such a functional entity could be implemented within any network element or distributed among a plurality of network elements associated with PBB-EVPN, e.g. in PE devices (sometimes interchangeably referred to as "PE nodes").

As used herein, the term 'network element' is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

As will be appreciated by one skilled in the art, aspects of the present disclosure, in particular the functionality of the MAC learning processing system described herein, may be embodied in various manners. Accordingly, other aspects of the present disclosure relate to systems, computer programs, mechanisms, and means for carrying out the methods according to various embodiments described herein. Such systems, computer programs, mechanisms, and means could be included within various network devices, such as e.g. switches and routers, in particular within PE devices. A computer program may, for example, be downloaded (updated) to the existing network devices and systems (e.g. to the existing routers, switches, various control nodes, etc.) or be stored upon manufacturing of these devices and systems.

In yet another aspect, the present application relates to one or more non-transitory computer readable storage media encoded with software comprising computer executable instructions and, when executed by a processor of a computer, operable to carry out the method according to various embodiments described herein.

In yet another aspect, the present application relates to a data structure for assisting learning of C-MAC addresses on PE devices, in particular a data structure for use as a MAC announcement message according to IEEE802.1ah Provider Backbone Bridge (PBB) protocol and Ethernet VPN (EVPN) protocol. In an embodiment, the data structure includes a MAC identifier value field encoding an identification of the first MAC address. In an embodiment, such a data structure may be encapsulated with ESI-1 backbone MAC (B-MAC) address that is assigned to Ethernet Segment 1. All PE devices which are connected locally to ES-1 (such as first PE) add PBB-EVPN encapsulation for traffic going to the core network. If the traffic is received from ES-1, ESI-1 B-MAC is used in the encapsulation.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

EXAMPLE EMBODIMENTS

Basics of PBB-EVPN Networks

For purposes of illustrating the techniques for assisting MAC address learning and techniques for preventing MAC learning flip-flop issues, described herein, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

As previously described herein, a computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

A service provider network can provide service to customer networks via Provider Edge (PE) devices (e.g. routers or switches) that are located at the edge of the service provider network. Each PE device may be connected directly to a Customer Edge (CE) device (e.g. host, router or switch) located at the edge of a customer network. In other cases, an Access Network (AN) may provide connectivity (via Ethernet Virtual Circuits (EVC)) in order to interconnect PE and CE devices. In some instances, the AN can be an Ethernet Access Network (EAN) that can support EVCs by utilizing 802.1Q encapsulations. Alternatively, the AN can be a IP or a MPLS network that can support EVCs by utilizing Ethernet over IP encapsulation or Ethernet over MPLS encapsulation, respectively. The PE devices in a service provider network may be connected by an MPLS infrastructure that provides benefits such as fast-reroute and resiliency. The PE devices may also be connected by an IP infrastructure that utilizes Generic Routing Encapsulation (GRE) tunneling or other IP tunneling between the PE devices.

EVPN is a layer 2 VPN technology built over a Packet Switched Network (PSN) (e.g. utilizing an MPLS/IP infrastructure). An EVPN instance includes CE devices that are connected to PE devices that form the edge of the MPLS infrastructure. An EVPN instance can include one or more broadcast domains (e.g. one or more VLANs) that are assigned to a given EVPN instance by the provider of the EVPN service. The PE devices provide virtual layer 2 bridged connectivity between the CE devices. A service provider network can include multiple EVPN instances. EVPN provides advanced multi-homing capabilities and uses Border Gateway Protocol (BGP) to distribute customer MAC address information over the core MPLS network.

Ethernet Provider Backbone Bridging (PBB) can be combined with EVPN to create a PBB-EVPN. In PBB-EVPN, MAC-in-MAC tunneling is employed to improve service instance and MAC address scalability in Ethernet networks. PBB-EVPN reduces the number of BGP MAC advertisement routes by aggregating Customer/Client MAC (C-MAC) address via Provider Backbone MAC address (B-MAC).

EVPN and PBB-EVPN can each provide a service provider network with solutions for multipoint Ethernet services utilizing MPLS/IP networks and advanced multi-homing capabilities. For example, EVPN and PBB-EVPN can each support single-homed devices, single-homed networks, multi-homed devices and multi-homed networks. A customer multi-homed device or a customer multi-homed network (together referred to in the following as a "CE device") can tolerate certain network failures because the connection to two or more PE devices provides additional redundancy. In the case where a CE device is multi-homed to two or more PE devices, the set of Ethernet links between the CE device and the PE devices constitutes an Ethernet Segment (ES). In an all-active mode, all of the PEs attached to a CE multi-homed device are allowed to forward traffic to/from that customer device.

C-MAC addresses corresponding to CE devices should be learned on PE nodes that are actively involved in forwarding traffic to, or from, these addresses. C-MAC learning is a data plane operation of PE nodes. A PE node learns a MAC address by receiving traffic from the address. If a PE now has not received traffic from a particular MAC address, a PE node does not know that MAC address. In other words, a PE node may not know a MAC address to which traffic may need to be forwarded unless traffic from that MAC address has been received.

Assisting MAC Address Learning

The all-active multi-homing topology provided in PBB-EVPN can create asymmetric paths for bi-directional traffic where one multi-homing PE device may receive traffic from a particular C-MAC address via a local connection to a CE device while another PE device in the same multi-homing group may need to send traffic to that C-MAC address. Because the latter PE device has not received traffic from that C-MAC address, it cannot learn the address. Such a PE device then ends up continuously flooding traffic to that C-MAC address. Flooding traffic goes to both to PBB-EVPN core and access edge, wasting link bandwidth at both core and edge networks.

How to prevent traffic flooding caused by the asymmetric MAC address learning on multi-homing PE nodes is not described in PBB-EVPN draft. This is an important issue in PBB-EVPN technology that needs to be addressed.

Figure 2:
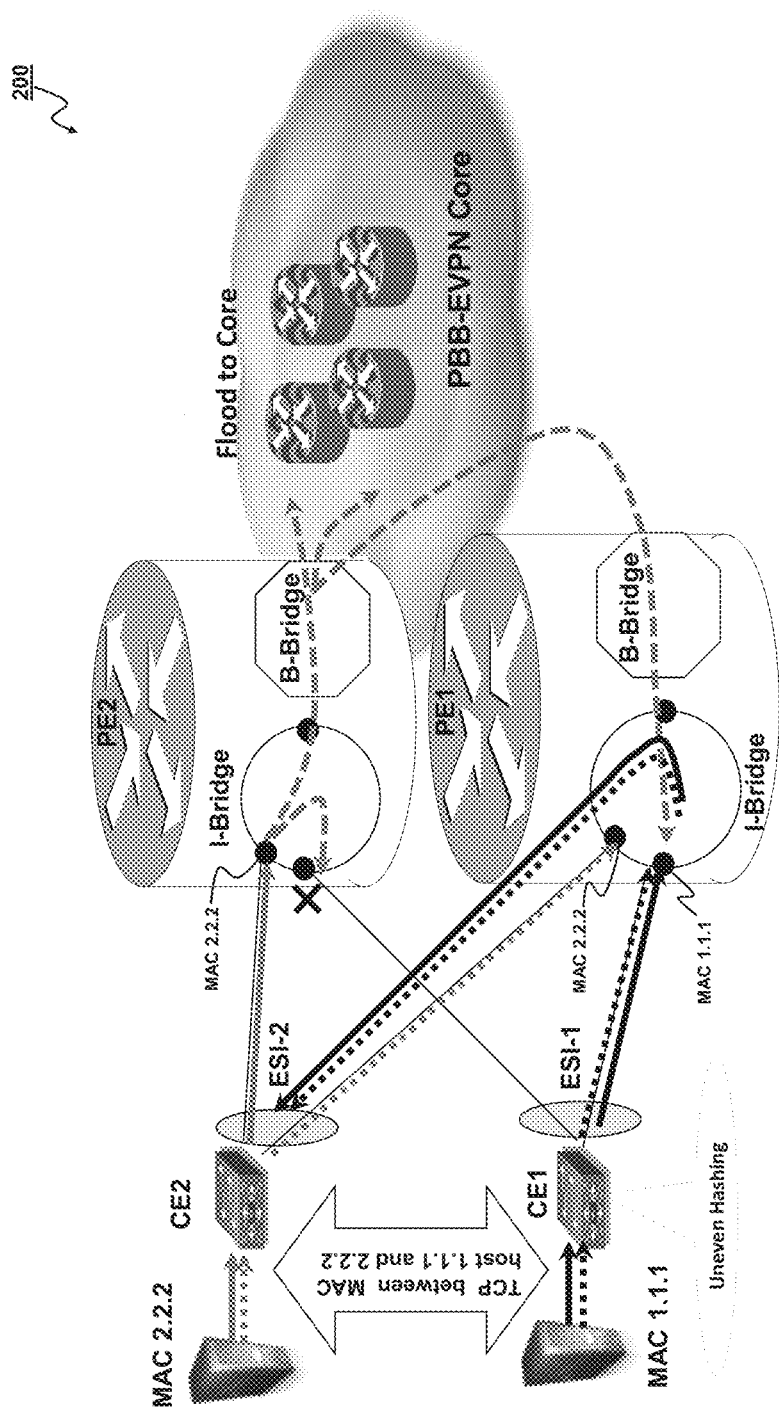
FIGS. 2-4 illustrate different examples of asymmetric MAC address learning that could happen in the service provider network of FIG. 1.
Figure 3:
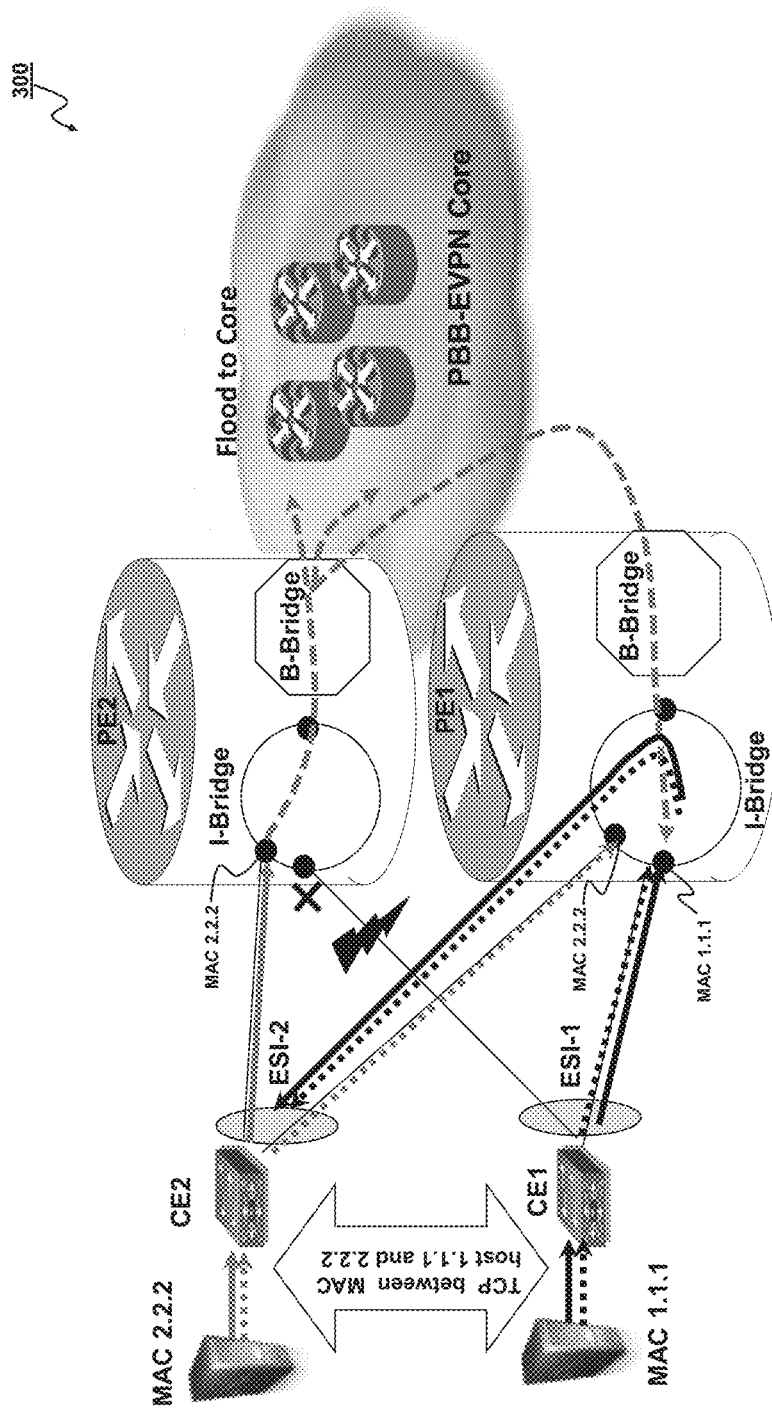
Figure 4:
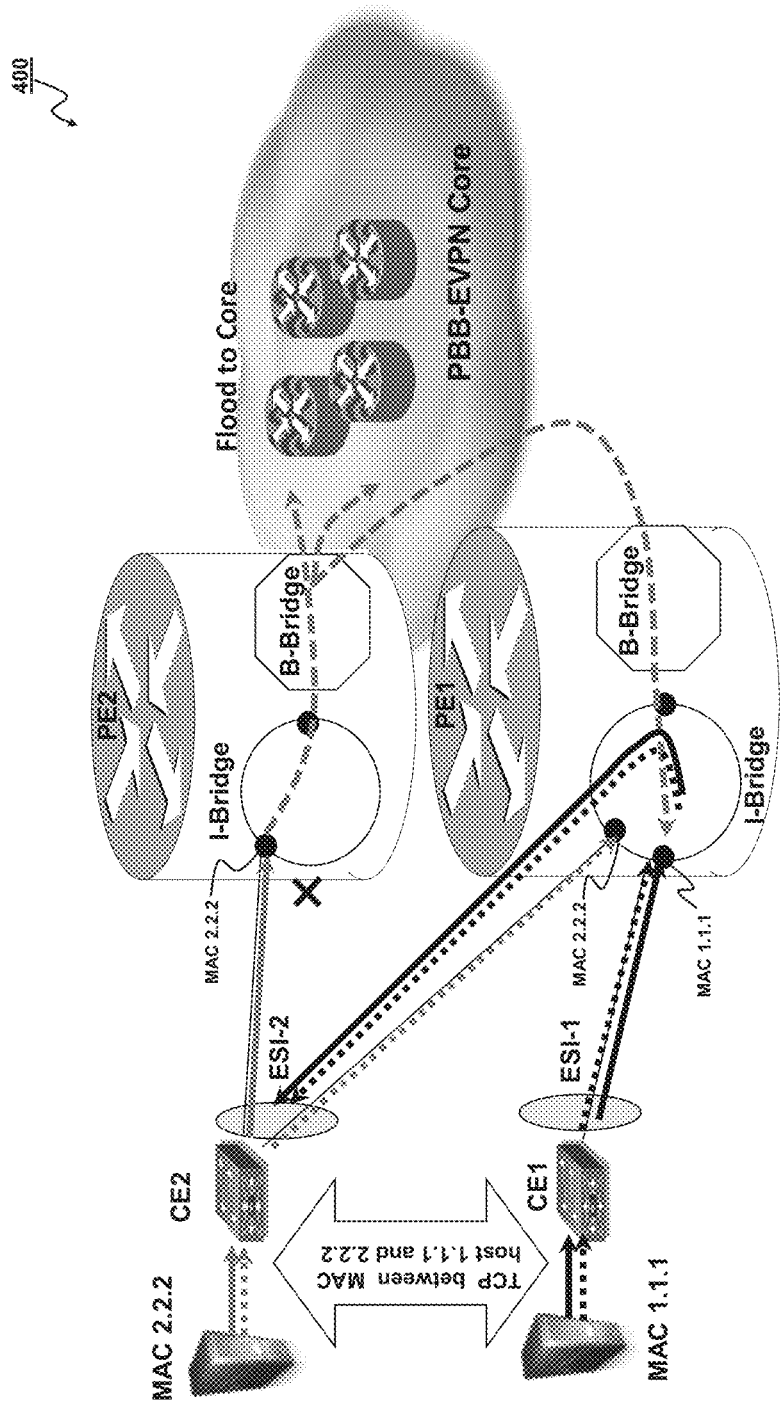
Figure 5:
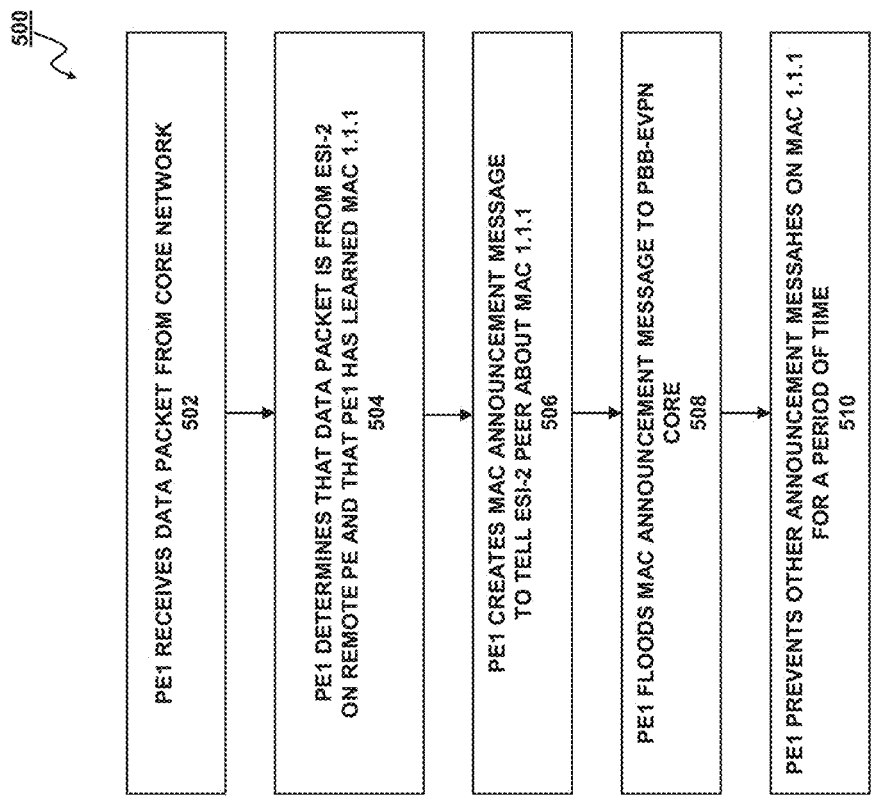
FIG. 5 is a flow diagram of a method for assisting MAC address learning in PBB-EVPN networks, according to some embodiments of the present disclosure.
Figure 6:
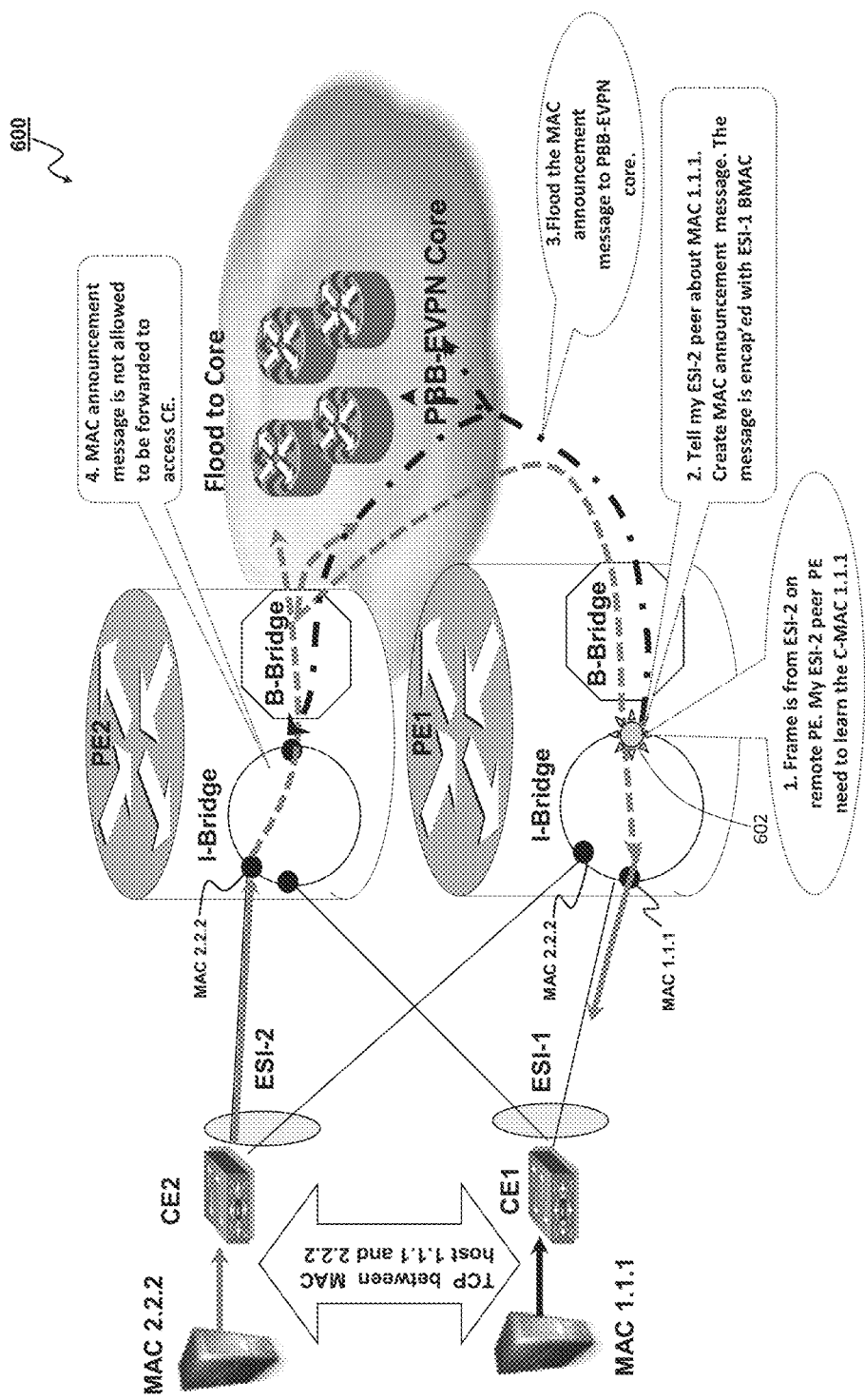
FIG. 6 illustrates exemplary implementation of the method for assisting MAC address learning in the example network environment of FIG. 1, according to some embodiments of the present disclosure.
Figure 7:
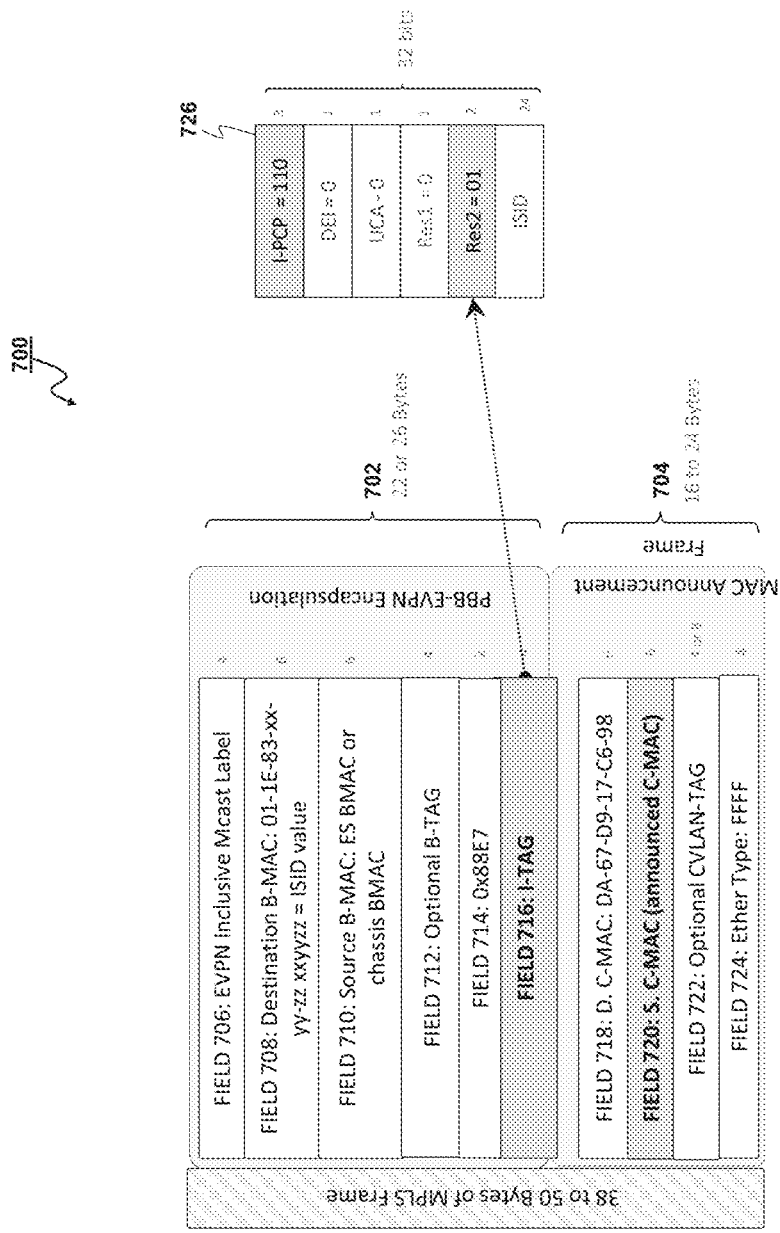
FIG. 7 illustrates an exemplary MPLS packet for announcing a C-MAC address, according to some embodiments of the present disclosure.
Figure 8:
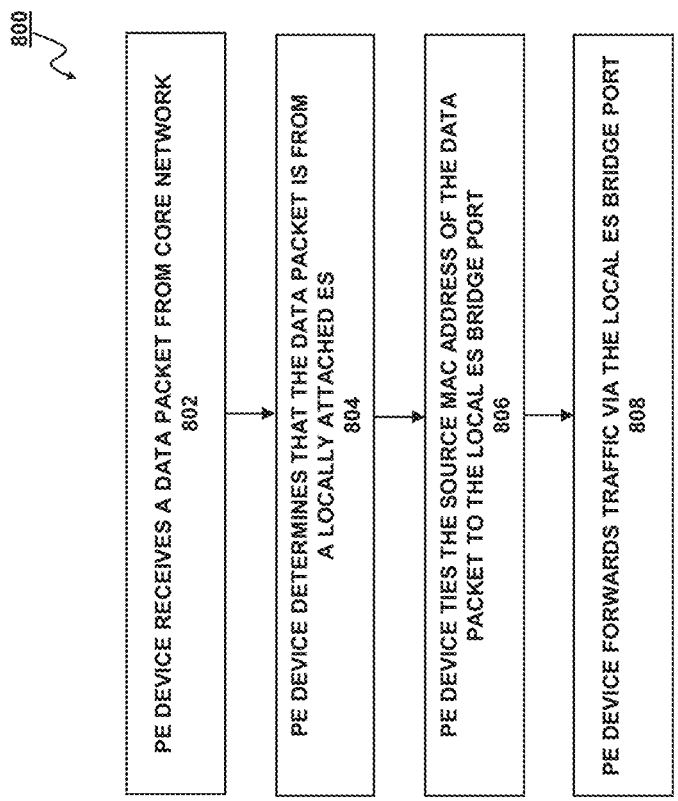
FIG. 8 is a flow diagram of a method for reducing MAC address flip-flopping in PBB-EVPN networks, according to some embodiments of the present disclosure.
Figure 9:
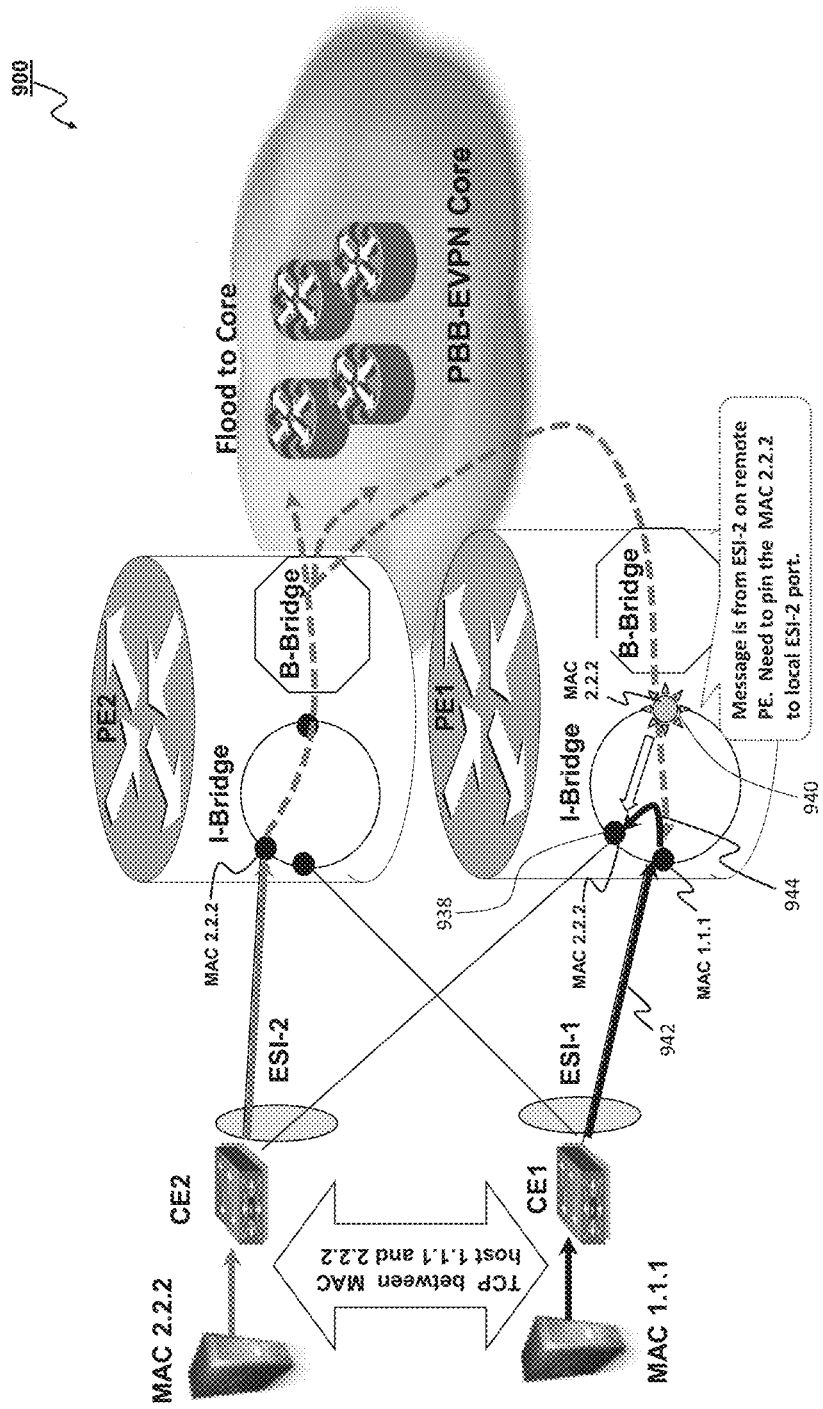
FIG. 9 illustrates exemplary implementation of the method for reducing MAC address flip-flopping in the example network environment of FIG. 1, according to some embodiments of the present disclosure.
Figure 10:
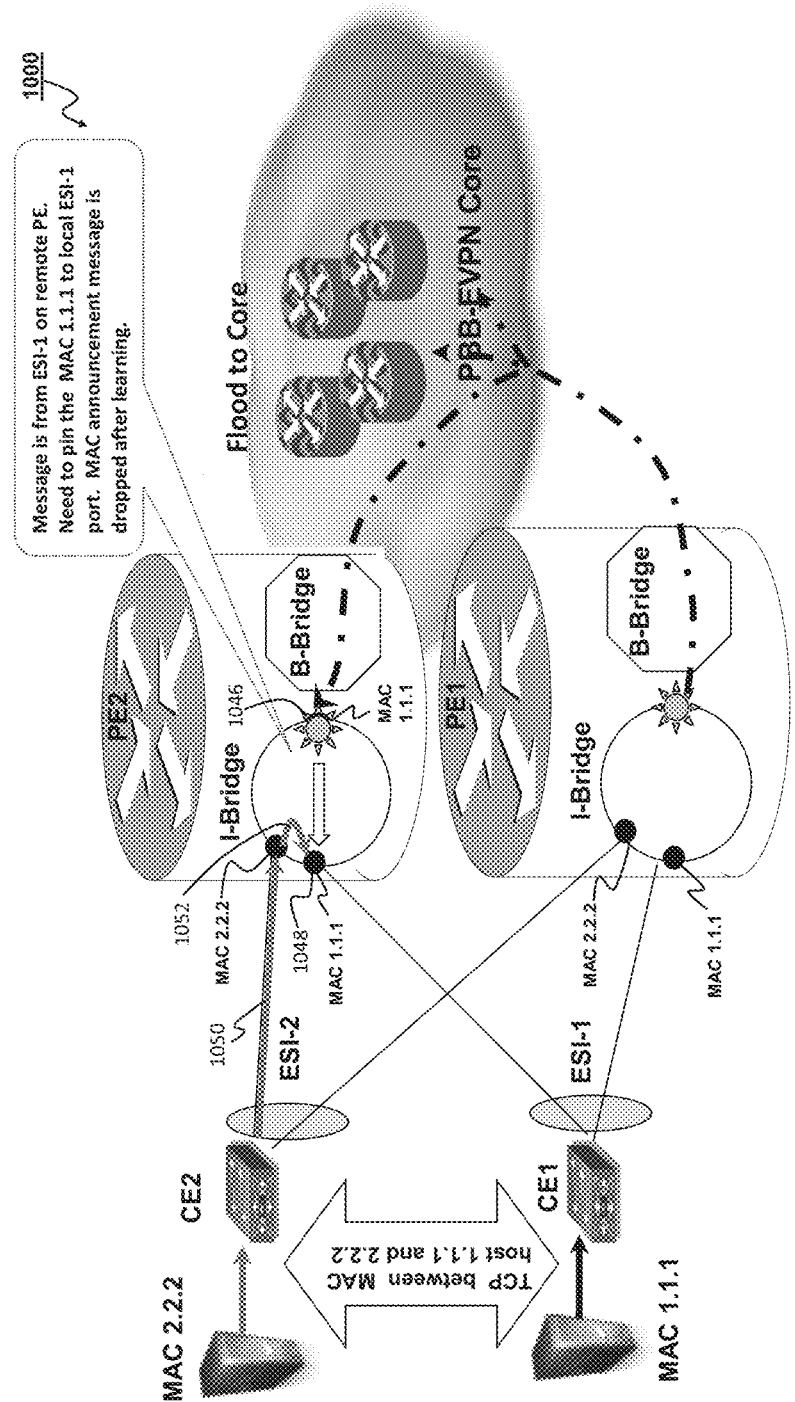
FIG. 10 illustrates exemplary implementation of the method for reducing MAC address flip-flopping in the example network environment of FIG. 6, according to some embodiments of the present disclosure.
Figure 12:
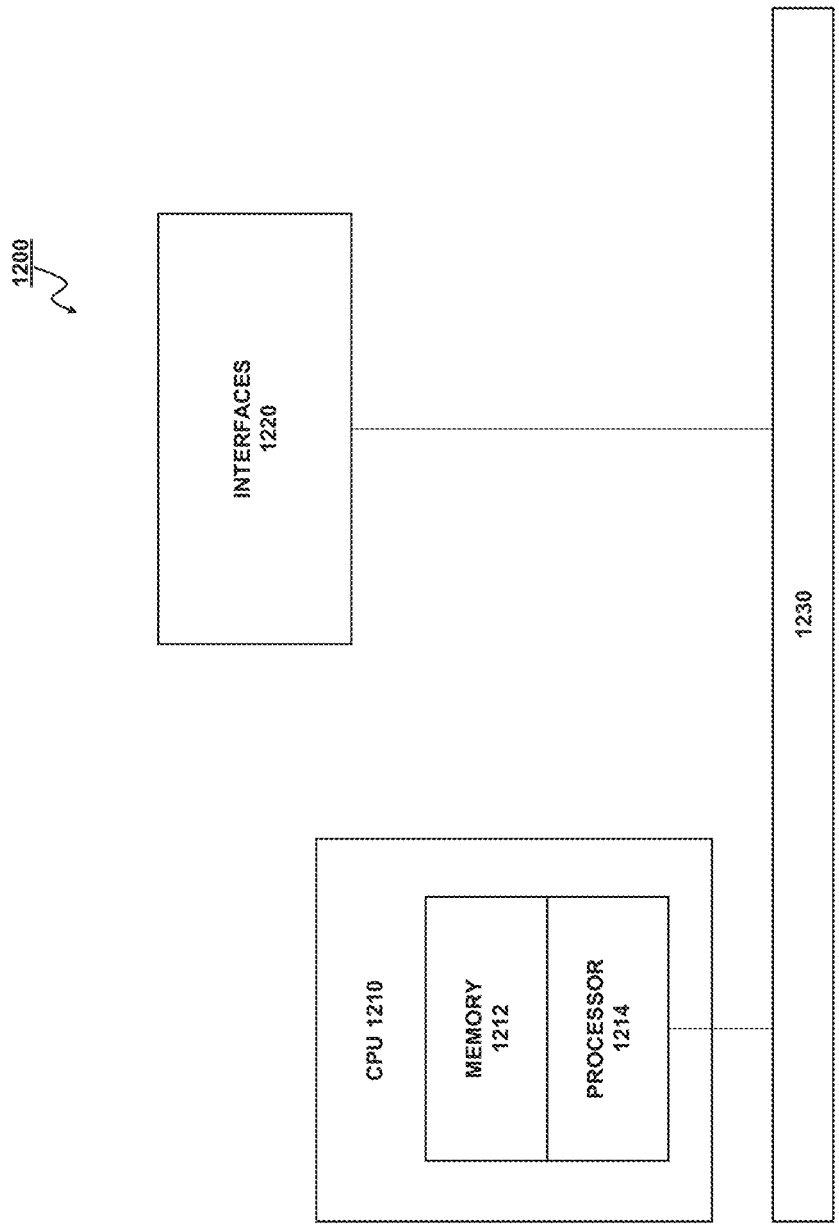
FIG. 12 illustrates an example of a network device, according to some embodiments of the present disclosure.
Figure 13:
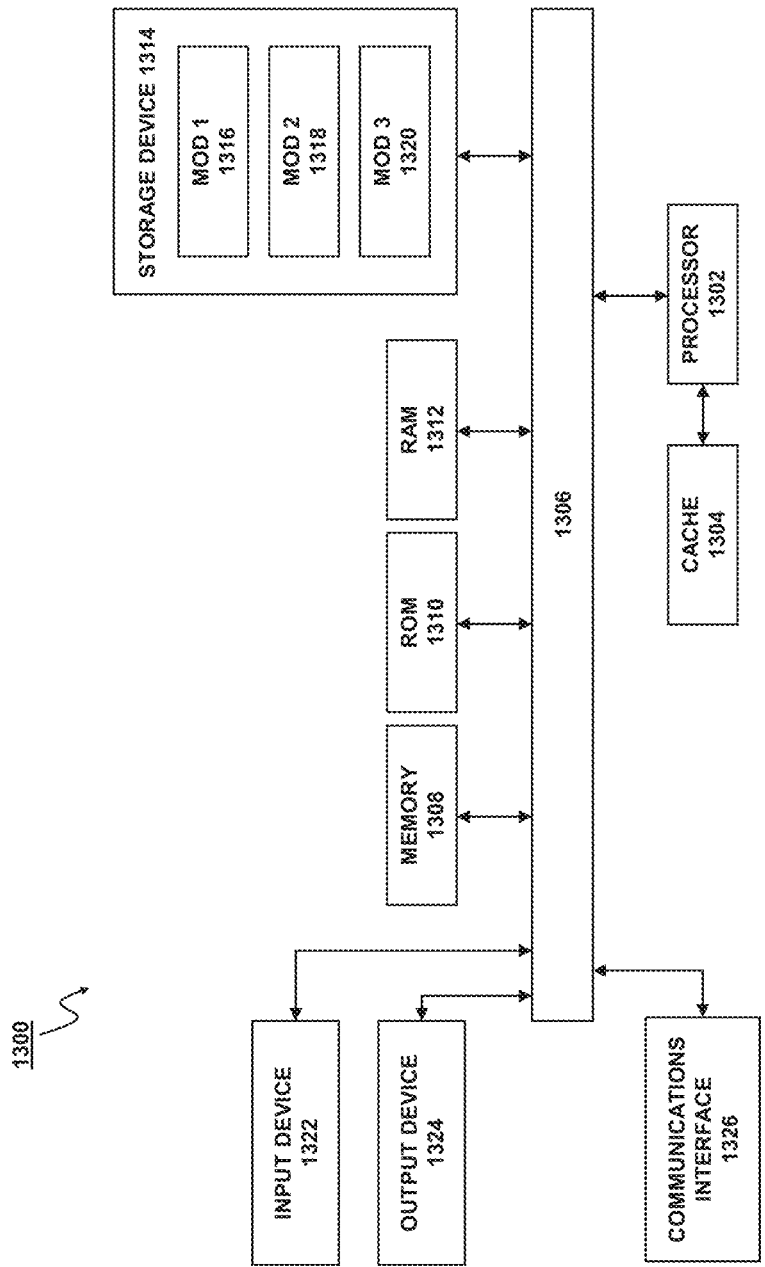
FIGS. 13 and 14 illustrate example system embodiments, according to various embodiments of the present disclosure.
Figure 14:
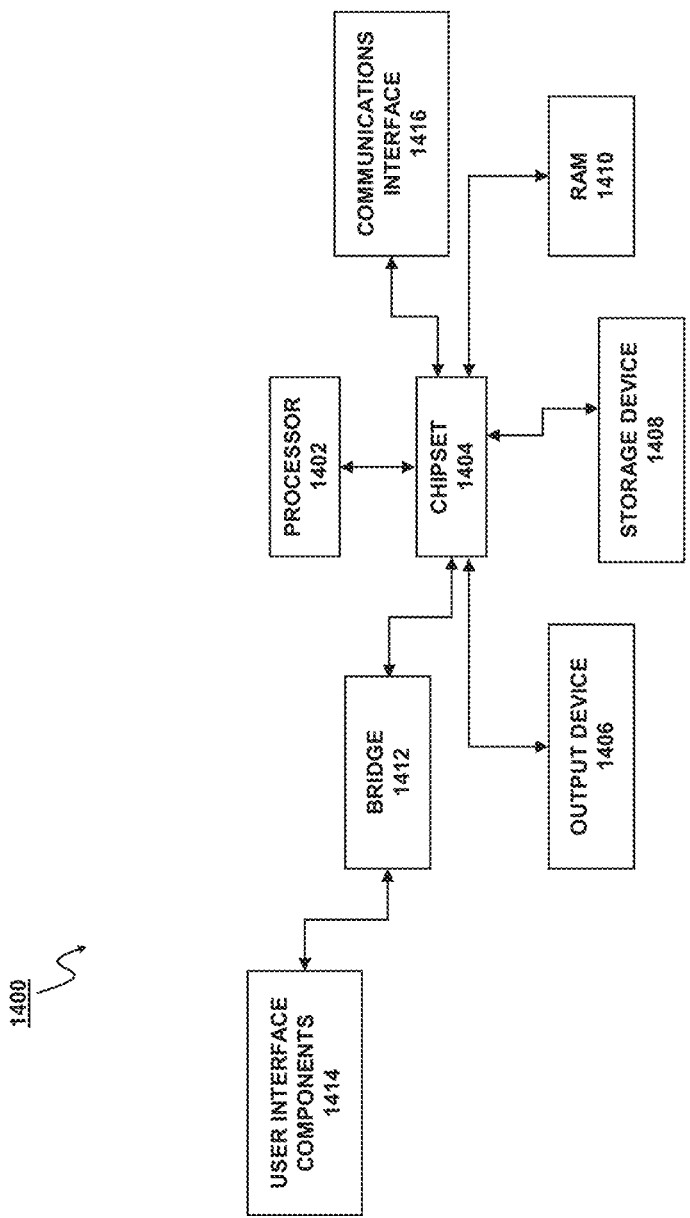

Some of the techniques described herein address the need in the art for reducing or eliminating traffic flooding in PBB-EVPN networks caused by asymmetric MAC address learning on multi-homing PE nodes. Disclosed are systems, methods, and computer-readable storage media for assisting MAC address learning at PE devices. A description of an exemplary network environment, as illustrated in FIG. 1, is first disclosed herein. A discussion of possible causes of asymmetric MAC address learning will then follow, including examples and variations as illustrated in FIGS. 2-4. Improved techniques for assisting MAC address learning at PE devices will then be disclosed, including examples and variations as illustrated in FIGS. 5-7. Then improved techniques for reducing MAC address movement are disclosed, including examples and variations as illustrated in FIGS. 8-10. In some implementations, these techniques could advantageously be combined with the improved techniques for assisting MAC address learning at PE devices, described herein. In other implementations, these techniques could be used when the improved techniques for assisting MAC address learning at PE devices as described herein are not used. The discussion concludes with a brief description of a steady state flow shown in FIG. 11, and a brief description of example devices, as illustrated in FIGS. 12-14. These variations shall be described herein as the various embodiments are set forth. The disclosure now turns to FIG. 1.

FIG. 1 illustrates a schematic block diagram of an example network environment of a service provider network 100 including nodes/devices interconnected by various methods of communication. Elements of FIG. 1 may be coupled to one another through one or more interfaces employing any suitable connections (wired or wireless), which provide viable pathways for network communications. Additionally, one or more of these elements may be combined, divided, or removed from the architecture based on particular configuration needs. For ease of illustration, not all elements of FIG. 1 are depicted with communication lines traversing the network environment 100.

In the network environment 100, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node and a destination node via a network. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

The service provider network 100 can include any number of provider edge (PE) devices, shown in FIG. 1 as PE1 112 and PE2 122. The PE devices PE1 112 and PE2 122 can communicate with each other over a PBB-EVPN core network 102, e.g. an MPLS network. The service provider network 100 can also include any number of Customer Edge (CE) devices, such as CE1 114 and CE2 124. A CE device may be a host, a router, or a switch and may be either single-homed (i.e. connected to one PE) or multi-homed (connected to more than one PE). The PEs can provide virtual Layer 2 bridged connectivity between the CEs. To that end, each PE device in the service provider network 100 can have one or more bridge ports (shown in the FIGUREs as black dots in I-Bridges of PE devices) that can be used to provide network connectivity to the CE devices and the PBB-EVPN core network. A bridge port on a PE device can be a physical port such as a 10GE interface or logical port such as a 2×10GE bundle.

One or more client/customer devices/hosts may be connected to each CE device. FIG. 1 illustrates only one exemplary host device connected to each CE device—a host with a MAC address MAC 1.1.1 116 is connected to the CE device CE1, and a host with a MAC address MAC 2.2.2. 126 is connected to the CE device CE2. If other hosts would be connected to any of the CE devices, they would have different MAC addresses. Each of MAC host MAC 1.1.1 and MAC 2.2.2 has access to PBB-EVPN PE nodes through a corresponding local CE device.

Service provider network 100 can provide multipoint Ethernet service by utilizing PBB-EVPN. PBB-EVPN PEs can signal Ethernet Segment ID (ESI) of their corresponding multi-homed CEs and Backbone MAC address of each ESI using Border Gateway Protocol. This can enable the PEs to learn what CEs or networks are multi-homed.

When a CE is multi-homed, i.e. it is connected to more than one PE, there are two redundancy modes of operation. In all-active mode, all of the PEs attached to a particular ES are allowed to forward traffic to/from that ES. In single-active mode, only a single PE (the designated forwarder), among a group of PEs attached to a ES, is allowed to forward traffic to/from the ES.

I-Bridge and B-Bridge in each of the PE devices in the service provider network 100 illustrate Provider Backbone Bridge (PBB) topology. I-Bridge represents a bridge domain tagged with backbone service Instance tag (I-TAG). Access CE/network is connected to I-Bridge directly. B-Bridge represents a bridge domain directly connected to backbone network. Traffic bridged in I-Bridge includes customer Ethernet frames. Traffic bridged in the B-Bridge includes customer frames encapsulated in PBB headers (also called MAC-in-MAC header). I-TAG in the PBB header identifies the I-Bridge of a customer frame.

Those skilled in the art will recognize that the number of devices shown and the specific configuration shown in the service provider network 100 is for illustrative purposes and does not limit the present technology. Network environments that include additional and/or different components and connections are contemplated herein and are within the scope of the present disclosure.

In the exemplary illustration of the FIGUREs, each of the CE devices CE1 and CE2 may be multi-homed (in the exemplary illustration of the FIGUREs—dual-homed) by the PE devices such as PE1 and PE2, a set of Ethernet links between the CE device CE1 and the PE devices PE1 and PE 2 constitutes an Ethernet Segment (ES) identified by an ESI-1 (indicated in the FIGUREs as ESI-1 118), and a set of Ethernet links between the CE device CE2 and the PE devices PE1 and PE 2 constitutes an ES identified by an ESI-2 (indicated in the FIGUREs as ESI-2 128). Ethernet links that belong to set ES1 are shown in FIG. 1 as Ethernet Connection (EC) 130 between CE1 and PE1 and EC 132 between CE1 and PE2. Ethernet links that belong to set ES2 are shown in FIG. 1 as EC 134 between CE2 and PE1 and EC 136 between CE2 and PE2. In an all-active mode, all of the PEs attached to a CE multi-homed device are allowed to forward traffic to/from that customer device.

Furthermore, in the exemplary illustration of the FIGUREs, the MAC 1.1.1 is assumed to have two continuous conversations/flows with the MAC 2.2.2, indicated in the FIGUREs with a TCP connection 104. IP traffic flows from MAC 1.1.1 are indicated in the FIGUREs as two exemplary flows, one shown with solid thick black lines ending with arrows, and the other shown with dotted thick black lines ending with arrows, illustrated in FIG. 1 from MAC 1.1.1 to CE1. Similarly, IP traffic flows from MAC 2.2.2 are also indicated in the FIGUREs as two exemplary flows, one shown with solid thick grey lines ending with arrows, and the other shown with dotted thick black grey ending with arrows, illustrated in FIG. 1 from MAC 2.2.2 to CE2.

In all-active multi-homing topology such as illustrated in FIG. 1, multiple L2 paths between a pair of hosts MAC 1.1.1 and MAC 2.2.2 may exist. In some scenarios, MAC addresses may be learned on one path but missed on another, resulting in asymmetric MAC address learning, which is undesirable because it results in traffic flooding. Three such exemplary scenarios are shown in FIGS. 2-4. Each of the FIGS. 2-4 illustrates a network environment similar to that shown in FIG. 1, without the reference numerals shown in FIG. 1, in order to not clutter the drawings.

FIG. 2 illustrates a service provider network 200 showing an example of multi-homing traffic flood due to poor load balancing on a CE device. In the example of FIG. 2, both CE devices CE1 and CE2 are dual-homed by PE nodes PE1 and PE2, and each CE device can load balance traffic to both PE1 and PE2.

In the example of FIG. 2, CE2 may evenly distribute the two flows from MAC 2.2.2 to PE1 and PE2, as shown in FIG. 2 with one of the IP flows (dotted grey line) going from CE2 to PE1 (i.e. sent from CE2 to PE1 over the EC 134) and the other one of the IP flows (solid grey line) going from CE2 to PE2 (i.e. sent from CE2 to PE2 over the EC 136). Since both PE1 and PE2 receive traffic from CE2, both PE1 and PE2 learn MAC address MAC 2.2.2, which is illustrated in FIG. 2 with an indication MAC 2.2.2 pointing to the port in each PE1 and PE2 on which that MAC address was learned.

CE1, on the other hand, may send all traffic flows from MAC 1.1.1 only to PE1, e.g. as a result of CE1 performing uneven hashing in its load balancing. This is shown in FIG. 2 with both of the IP flows (solid and dotted black lines) going from CE1 to PE1 (i.e. sent from CE1 to PE1 over the EC 130). Since PE1 receives traffic from CE1, PE1 learns MAC address MAC 1.1.1, which is illustrated in FIG. 2 with an indication MAC 1.1.1 pointing to the port in PE1 on which that MAC address was learned. Since PE2 does not receive traffic from CE1, PE2 cannot learn MAC address MAC 1.1.1, which is illustrated in FIG. 2 with a cross near the port in PE2 on which MAC address 1.1.1 was not learned. In this case, asymmetric bi-directional traffic paths are formed between the two MAC hosts. Since PE2 has not learned MAC address 1.1.1, it cannot do unicast forwarding of traffic that it receives from CE2 and that is directed to MAC 1.1.1 and it ends up always flooding traffic to MAC 1.1.1 to the core network 102, as shown in FIG. 2 with dashed grey arrows going from PE2 to various network elements. As is known, traffic flooding in this context refers to sending data packets to all bridge ports in I-Bridge and all bridge ports in B-Bridge. The B-Bridge has a point-tomultipoint EVPN bridge port in this case. Traffic is sent to every PE in core network via ingress replication, i.e. PE2 replicates traffic for each destination PE in core. Each replicated copy is sent to its destination PE by MPLS forwarding.

FIG. 3 illustrates a scenario that is only slightly different from that of FIG. 2 in that bi-directional traffic flooding on PE2 is now due to a link failure. Similar to FIG. 2, in a service provider network 300 shown in the example of FIG. 3, both CE1 and CE2 are dual-homed by PE nodes PE1 and PE2 and each CE device can load balance traffic to both PE1 and PE2. However, while this function properly for CE2, CE1 happens to distribute all traffic flows from MAC 1.1.1 only to PE1 due to a link failure between CE1 and PE2. The result is the same as in FIG. 2—since PE2 does not receive traffic from CE1, PE2 cannot learn MAC address MAC 1.1.1 and ends up always flooding traffic to MAC 1.1.1.

FIG. 4 illustrates a scenario that is also only slightly different from that of FIGS. 2 and 3 in that traffic flooding on PE2 is now due to CE1 being single-homed to only PE2. In a service provider network 400 shown in the example of FIG. 4, CE2 is dual-homed by PE nodes PE1 and PE2, and distributes traffic flows from MAC 2.2.2 to both PE1 and PE2, enabling learning of MAC 2.2.2 on both PE1 and PE2. On the other hand, CE1 is single-homed to PE1, i.e. CE1 can only send all traffic to PE1 (in this case ESI-1 only includes EC 130, EC 132 is not present). The result is the same as in FIGS. 2 and 3—since PE2 does not receive traffic from CE1, PE2 cannot learn MAC address MAC 1.1.1 and ends up always flooding traffic to MAC 1.1.1.

Scenarios such as the above three examples of bi-directional traffic flooding are very common in PBB-EVPN networks. Cases of permanent flooding have currently limited the deployment of PBB-EVPN technology in production networks.

Aspects of the present disclosure aim to improve on the deficiencies of the current state of the art by providing a method for assisting MAC address learning that could prevent bi-directional traffic flooding by introducing a data plane MAC announcement message in a PBB-EVPN network. The method is based on the proposed frame announcing a C-MAC address to all PE nodes in an all-active multi-homing group identified by a certain ESI or to all PBB-EVPN PE nodes which provide service to that service instance (I-SID) of the C-MAC. PE nodes can learn the C-MAC from the announcement message without any control plane signaling. Thus, the method provides a light weight data plane solution to compensate for the lack of control plane signaling of C-MAC in PBB-EVPN networks.

FIG. 5 illustrates an example method 500 for assisting MAC address learning in PBB-EVPN networks. Steps of the method 500 are described with reference to the elements and to the exemplary configuration of the network environment 100, and with reference to the scenario described above where PE2 is the PE device that has not learned MAC 1.1.1 for reasons such as e.g. those described for FIGS. 2-4. Based on the descriptions provided herein, these steps could be easily extended to other configurations and other network environments, all of which are within the scope of the present disclosure.

The method 500 may begin at step 502 where a PE device, in the example considered—PE1, receives a data packet from the core network 102.

The method then proceeds to step 504 where the PE device PE1 checks originating ES of the received data packet by source B-MAC lookup within the packet. PE devices checking of the source B-MAC address for data packets received from the core network is typically done in PBB-EVPN traffic forwarding operations. According to embodiments of the present disclosure PE1 is configured to further use the determined B-MAC address to determine the originating ES and to determine whether PE1 has a local connection in this ES.

It may be that, as a result of this check, PE1 determines that the originating ES is local (i.e. that the first PE device has a local connection to the originating ES identified in the received packet). This could be the case if the data packet received in step 502 reached the PE device PE1 as a result of the PE device PE2 flooding traffic destined to MAC 1.1.1 because PE2 has not learned MAC 1.1.1 address due to e.g. one of the reasons described with reference to FIGS. 2-4. When PE1 would then check the originating ES for the received packet, it would determine that the packet is from ESI-2 and that ESI-2 is local to PE1 because PE1 has an Ethernet connection (EC 134) to a CE device in this ES, namely to CE2. Thus, PE1 would determine that the received data packet is from ESI-2 on a remote peer (PE2).

Also as a part of step 504, since PE1 determined that the received data packet is from ESI-2 on a remote peer PE2, PE1 further identifies that the remote peer PE2 is also in the same ES group of ESI-2 that needs to send traffic to the destination C-MAC (MAC 1.1.1) in that service instance identification (I-SID), e.g. I-SID 1000, through PE1. In other words, PE1 would also determine that it has learned the MAC address 1.1.1. Since PE1 always sends reverse directional traffic back to CE through a locally attached link in the ES group, there is a chance PE2 does not learn the destination C-MAC address MAC 1.1.1, so PE1 is configured to conclude that PE2 need to learn MAC 1.1.1.

Steps 502 and 504 are illustrated in FIG. 6 showing the traffic flooding (grey dashed lines) by PE2 which results in PE1 receiving the data packet in step 502, at a port 602. Step 1 in FIG. 6 illustrates that PE1 determines that the received packet is from the ESI-2 segment that is local to PE1, which means that the packet is from a remote peer of PE1 on ESI-2 (in this case the remote peer is PE2). Step 1 also illustrates that PE1 would also determine that it has learned the MAC address 1.1.1 and conclude that its' remote peer on ESI-2 should learn this address as well.

It should be noted that in case a PE device determines, in step 504, that the data packet received from the core network is not from one of the ES's in which the PE device has a local connection and/or that there are no MAC addresses learned on the PE device, then PE device will not take further actions as described in the rest of FIG. 5. Further, in an optional embodiment where repeat sending out of MAC announcements is prevented for a certain period of time, described in greater detail below, even when the determination of step 504 is positive, the PE device may still be configured to not take further actions as described in the rest of FIG. 5 if the timer set after sending out the last MAC announcement has not expired. In other cases, the method 500 may proceed to step 506.

In step 506, PE1 creates an announcement message announcing the MAC address MAC 1.1.1, in order to tell its ESI-2 remote peer about this MAC address. In step 508, PE1 floods the announcement message to the core network 102. Steps 506 and 508 are illustrated in FIG. 6 with steps 2 and 3, respectively. Step 2 in FIG. 6 illustrates that PE1 determines that it is necessary to tell the ESI-2 peer of PE1 about MAC 1.1.1. PE1 then creates an announcement message, including an inner MAC announcement frame, announcing MAC 1.1.1 and encapsulates the MAC announcement frame within PBB-EVPN header, as described in greater detail below. Step 3 in FIG. 6 illustrates that PE1 then sends out the MAC announcement message to all PE devices which are locally attached to ESI-2, or to all PE devices providing service to that particular I-SID (i.e. to the I-SID 1000 in this example). Black dotted-dashed lines in FIG. 6 illustrate exemplary paths for sending the MAC announcement message.

Steps 502-508 are traffic driven, i.e. an all-active multi-homing PE device (PE1 in this example) that has learned a particular C-MAC address from a local connection to the CE device (the C-MAC address being MAC 1.1.1 and the local CE device being CE1 in this example) is triggered to send out a MAC announcement message announcing MAC 1.1.1 by receiving traffic from a remote PE (PE2 in this example) in the same ES group (ESI-2 in this example). Such operation advantageously allows avoiding traffic burst caused by MAC announcements in the PBB-EVPN core network.

In some embodiments, additional measures may be implemented to further limit sending out of MAC announcement messages. For example, in an embodiment, announcements could be limited to one announcement per a particular C-MAC for a certain period of time, as shown in FIG. 5 with a step 510 in which, after the MAC announcement message was sent in step 508, PE1 prevents other announcement messages for this MAC for a period of time. To that end, after the MAC announcement message is sent in step 508, PE1 may start a throttling timer for the C-MAC being announced (i.e. for MAC 1.1.1). Doing so prevents repeated MAC announcements being sent to the core network 102. After the timer has expired, the same C-MAC can be announced again (thus, prior to sending out the MAC announcement in step 508, PE1 may further be configured whether there is an indication that the MAC announcement for this particular C-MAC should be prevented at this time, e.g. by checking whether a certain time period from the last announcement has expired). The time period during which repetition of MAC announcements for the same C-MAC is prevented should be selected to be long enough to reduce flooding of MAC announcement messages to the core network while being short enough to prevent the announced C-MAC aging out on the remote PE devices (i.e. learned MAC address becomes unlearned/removed after the MAC is not seen in data traffic for a certain period of time; a default MAC age is typically 5 minutes). For example, the timer may be selected to be 2.5 minutes or less, including all values and ranges below 2.5 minutes.

A PE node that receives a MAC announcement message sent in step 508 will learn the C-MAC to B-MAC binding from the frame, thus learning the C-MAC address being announced. A MAC announcement message may be provided in such a way that learning of the C-MAC address from the MAC announcement packet is analogous to learning the C-MAC from usual data traffic received from the PBB-EVPN core 102. However, unlike usual data traffic, the MAC announcement message preferably includes an indication prescribing a PE device that received the packet to drop the packet (i.e. to not forward the inner Ethernet frame to the CE devices) after learning of the C-MAC address being announced. For example, a receiving PE device (e.g. PE2 in this example) could be configured to automatically drop the announcement message by, or promptly after, the PBB decapsulation procedure that extracts the MAC address being announced (MAC 1.1.1 in this example), preventing forwarding of the frame to the CE devices. This is illustrated with step 4 in FIG. 6, showing that, at the receiving PE device PE2, the MAC announcement frame is not allowed to be forwarded to the access CE device CE2.

FIG. 7 illustrates a part of an exemplary MPLS packet 700 for announcing a C-MAC address, according to some embodiments of the present disclosure. Such a packet may be used to send out the announcement message as described herein. As shown in FIG. 7, the message 700 may include PBB-EVPN encapsulation information 702 and a MAC announcement frame 704, thus encapsulating the MAC announcement frame in a PBB-EVPN header specified in section 6.5 of RFC 7623 ("Provider Backbone Bridging Combined with Ethernet VPN").

The PBB-EVPN encapsulation information may include fields 706-716 as shown in FIG. 7, and be, in total, between 22 and 26 bytes. The MAC announcement frame 704 may include fields 718-724 as shown in FIG. 7, and be, in total, between 16 and 24 bytes.

Field 706 within the message 700 may encode an MLPS label value indicative of a label advertised with Inclusive Multicast Ethernet Tag Route, according to section 5.3 of PBB-EVPN RFC 7623. This is the label used for sending flooding traffic in PBB-EVPN core. Using this label ensures that the packet format complies with the PBB-EVPN standard RFC 7623.

Field 708 within the message 700 may encode a value indicative of a destination B-MAC address, e.g. in the format of 01-1E-83-xx-yy-zz, where xxyyzz is an I-SID value which identifies the broadcast domain of the C-MAC being announced in field 720. The B-MAC may be chosen such to meet the requirement of section 26.4 of PBB standard IEEE802.1Q-2011 standard ("IEEE Standard for Local and metropolitan area networks--Media Access Control (MAC) Bridges and Virtual Bridged Local Area Networks").

Field 710 within the message 700 may encode a value indicative of a source B-MAC address, which is used to identify the ES of C-MAC being announced. If the source C-MAC is behind a multi-homing ES, ES B-MAC is used in field 710. Otherwise, chassis B-MAC is used. With source B-MAC chosen this way, the MAC announcement message announces the originating ES while announcing the C-MAC. This enables the receiving PE of MAC announcement message to do ES-aware MAC learning, described in greater detail below.

Field 712 within the message 700 may encode a value indicative of an optional Backbone VLAN (B-VLAN) tag (B-TAG), specified in section 1.3 of PBB standard IEEE802.1Q-2011. If a PE device assigns an optional B-VLAN to B-Bridge, the B-VLAN tag should be used in the B-TAG field.

Field 714 within the message 700 may encode a value indicative of Ether Type 88E7 which is used to indicate a backbone service Instance tag (I-TAG).

Field 716 within the message 700 may encode a value indicative of an I-TAG specified in section 9.7 of the IEEE 802.1Q-2011 and is shown in FIG. 7 with an inset 726. Some sections of this field may encode values that prescribe specific behavior with respect to the MAC announcement, as described herein. In particular, as shown with one of the two fields highlighted in the inset 726, an I-PCP field of the I-TAG 716 may be set to be 110 (binary value) such that the MAC announcement packet is given higher priority than data traffic. As shown with another one of the two fields highlighted in the inset 726, a Rest field may be set to be 01 (binary value) such that the MAC announcement frame will be automatically dropped by the PBB de-encapsulation operation prescribed in section 6.10.1 of the IEEE802.1Q-2011 standard. In this manner, according to an embodiment of the present disclosure, the I-TAG field in the announcement message is specially flagged to mandate the drop of the inner frame as to prevent the frame from being passed to the CE devices (i.e. the announcement frame does not go to PBB access devices/networks). Configuring the fields in this manner allows safely using the MAC announcement message in a multi-vender PBB-EVPN network regardless of whether all PE nodes are capable of C-MAC synchronization.

Inside the MAC announcement frame 704, field 718 may encode a value of a destination (D.) MAC as a reserved MAC. Using a reserved MAC in this field allows CE/PE devices to drop the MAC announcement frame using MAC Access Control List (ACL). This may be particularly advantageous in cases when a PE device receiving the MAC announcement message cannot drop the inner frame by checking the I-TAG field. In various implementations, this Destination MAC can be any valid MAC address, "DA-67-D9-17-C6-98" shown in FIG. 7 provides an example of a special Cisco MAC. Since the local administrated bit is turned on, no other customers are entitled to use this MAC in PBB-EVPN network.

Field 720 within the MAC announcement frame 704 may encode a value indicative of a source (S.) C-MAC as a C-MAC to be announced (MAC 1.1.1 in the examples described herein).

Field 722 within the MAC announcement frame 704 may encode one or more optional VLAN tags. This field may further indicate the C-MAC being announced is associated with a customer VLAN and or a service VLAN.

Field 724 within the MAC announcement frame 704 may encode an Ether Type as FFFF (hexidecimal value), indicating that higher layer protocol data is unavailable, thus ensuring the shortest frame length and preventing the receiving PE devices from mistakenly identify the frame as a control protocol frame.

The MAC announcement message format in FIG. 7 is fully compliant with PBB standard IEEE 802.1Q-2011 and PBB-EVPN standard RFC 7623. Thus any PBB-EVPN PE devices can receive this message as standard compliant data traffic and learn the C-MAC via regular data traffic receiving operations.

Assisting C-MAC address learning on PE devices as described herein allows preventing a substantial portion of traffic flooding caused by the asymmetric MAC address learning on multi-homing PE devices. In some implementations, all all-active multi-homing PE devices in aPBB-EVPN network may be configured to perform the method for assisting C-MAC address learning on other devices, as described herein. Thus, all PEs may be configured to, in response to receiving a data packet from the core network, determine whether they have a local connection in the ES identified in the received data packet, determine whether they have learned a particular C-MAC address from a local connection to a CE device, and, upon positive determinations, send out a MAC announcement message announcing the C-MAC address they learned. Such an approach minimizes the number of C-MACs to be synchronized among multi-homing PE devices via MAC announcements. Since each PE device is configured to focus only at locally learned C-MAC addresses which need to be synched to all-active remote multi-homing peers, the number of C-MAC addresses to be synchronized is expected to a relatively small percentage of C-MAC addresses in the network. Hence MAC scale does not become an issue.

ES-Aware MAC Learning to Prevent MAC Address Learning Flip-Flop Issues

A typical MAC learning bridge on a PE device (e.g. an I-Bridge of either PE1 or PE2 shown in the FIGUREs) learns a MAC address when receiving an Ethernet frame on a particular bridge port. The learned MAC address is the source MAC in the Ethernet header of the received frame. Once learned, the MAC address is noted and tied to the bridge port on which the packet was received. The PE device then uses the bridge port for this MAC address for traffic switching in that all of the traffic that the PE device receives for this MAC address is unicast to the bridge port associated with the address.

Sometimes it can happen that a PE device that has already learned a particular MAC address on one bridge port, receives traffic from the same MAC address on a different bridge port (i.e. the bridge learns the MAC for the second time). When this happens, the PE device associates the latter bridge port to this MAC address (i.e. the MAC is switched from one bridge port to a different bridge port). This is typically referred to as a MAC move or MAC learning flip-flop. If both bridge ports continuously receive traffic from this MAC, there will be constant MAC moves between the two ports of the PE device. The bridge ends up wasting a lot of processing bandwidth performing these MAC moves, leaving less processing bandwidth for traffic forwarding.

PBB-EVPN multi-homing topology introduces multiple paths from a particular CE device to a particular PE device, e.g. one path could be over a local EC between the CE and the PE devices and another path could be over the core network. Hence, the MAC move problem becomes relevant for all-active multi-homing PE devices of PBB-EVPN networks as described herein. For example, with reference to FIG. 1, PE1 may first learn a MAC address MAC 2.2.2 when receiving an Ethernet packet from CE2 over the EC 134 on a bridge port 138. Once MAC 2.2.2 is learned in this way, when PE1 receives traffic destined to MAC 2.2.2 from CE1, PE1 unicasts the traffic to the bridge port 138 so that the traffic can be sent to CE2 over the EC 134. However, PE1 may also receive traffic from MAC 2.2.2 from a bridge port configured to receive traffic from the MPLS network 102, e.g. a port 140 shown in FIG. 1. This may happen e.g. when PE2 floods traffic originated from MAC 2.2.2 and destined to MAC 1.1.1 to the core network 102 because PE2 has not learned MAC 1.1.1, as shown in FIGS. 2-4. This will also happen even when techniques for assisting MAC learning as described above are applied because, as described above, sending of a MAC announcement message is triggered by receiving traffic from the core network, so there will be at least one instance when traffic may be received from the core network. MAC move is also an important issue in PBB-EVPN technology that needs to be addressed.

Techniques described below address the need in the art for reducing or eliminating MAC address flip-flopping in PBB-EVPN networks caused by asymmetric MAC address learning on multi-homing PE nodes. Systems, methods, and computer-readable storage media configured to function in accordance with these techniques may be explained with reference to an exemplary network environment, as illustrated in FIGS. 1-4 and 6, the descriptions of which are not repeated here in the interests of brevity. However, these technique may also be implemented with respect to any other PE devices that may happen to receive traffic from the same MAC source on two different bridge ports for any other reasons than those shown in the FIGUREs, and, therefore, may but do not have to be implemented in conjunction with implementing techniques for assisting MAC address learning as described above.

FIG. 8 is a flow diagram of a method 800 for reducing MAC address flip-flopping in PBB-EVPN networks, according to some embodiments of the present disclosure. Steps of the method 800 are described with reference to the elements and to the exemplary configuration of the network environment 100, and with reference to the scenario described above where PE2 is the PE device that has not learned MAC 1.1.1 for reasons such as e.g. those described for FIGS. 2-4. Based on the descriptions provided herein, these steps could be easily extended to other configurations and other network environments, all of which are within the scope of the present disclosure.

The method may begin with step 802, where a PE device receives a data packet from the core network. Similar to step 502 of FIG. 5, this could be e.g. the PE device PE1 receiving a data packet from the core network 102 as a result of PE2 flooding traffic to MAC 1.1.1 to the core network because PE2 has not learned MAC 1.1.1 address. In conventional approaches, as a result of receiving this data packet from MAC 2.2.2, PE1 would learn MAC 2.2.2 on the bridge port on which the data packet was received from the core network (port 140 shown in FIG. 1). However, according to the method 800, PE1 does not do this traditional bridge MAC learning. Instead, it does what may be described as ES-aware MAC learning. To that end, the method proceeds to step 804, where the PE1 determines originating ES for the data packet of step 802. This may be done by reading the source B-MAC in the PBB header of the received packet, as described above with reference to step 504. If the PE device determines that the originating ES is locally attached, then the PE device ties the learned customer MAC to the local ES bridge port (step 806). After that, the PE device forwards all traffic to this MAC address via the local ES bridge port (step 808). With this approach, customer MAC will never be tied to MPLS facing port as long as there is a local Ethernet connection to the CE. Thus, a MAC move does not happen during MAC learning. PE will always forward traffic to CE via local connection rather than through MPLS core, reducing bandwidth usage in the PBB-EVPN core.

A scenario according to the steps of FIG. 8 are illustrated in FIG. 9. FIG. 9 shows the traffic flooding (grey dashed lines, similar to those shown in FIG. 1) by PE2 which results in PE1 receiving a data packet from the core network 102 in step 802, at a port 940. Because PE1 determines, in step 804, that the data packet is from ESI-2 for which PE1 has a local connection, EC 134, and a bridge port supporting the local connection to that CE (CE2; bridge port 938), in step 806 PE1 pins the MAC address MAC 2.2.2 to the local bridge port 938, as shown in FIG. 9 with an arrow from port 940 to port 938. As a result of this, when PE1 receives traffic destined to MAC 2.2.2, shown in FIG. 9 with IP flow 942, PE1 unicasts the traffic to the port 938, shown in FIG. 9 with IP flow 944.

Similar scenario occurs on PE2 when PE2 receives a MAC announcement message from the core network 102 that was sent by PE1 according to the improved techniques for assisting MAC address learning described herein. This scenario is illustrated in FIG. 10.

FIG. 10 shows MAC announcement message being flooded, by PE1, to the core network (black dotted-dashed lines, similar to those shown in FIG. 6), which results in PE2 receiving a data packet from the core network 102 in step 802, at a port 1046. Because PE2 determines, in step 804, that the data packet is from ESI-1 for which PE2 has a local connection, EC 132, and a bridge port for supporting the local connection to that CE (CE1; bridge port 1048), in step 806 PE2 pins the MAC address MAC 1.1.1 to the local bridge port 1048, as shown in FIG. 10 with an arrow from port 1046 to port 1048. As a result of this, when PE2 receives traffic destined to MAC 1.1.1, shown in FIG. 10 with IP flow 1050, PE2 unicasts the traffic to the port 1048, shown in FIG. 10 with IP flow 1052.

Figure 11:
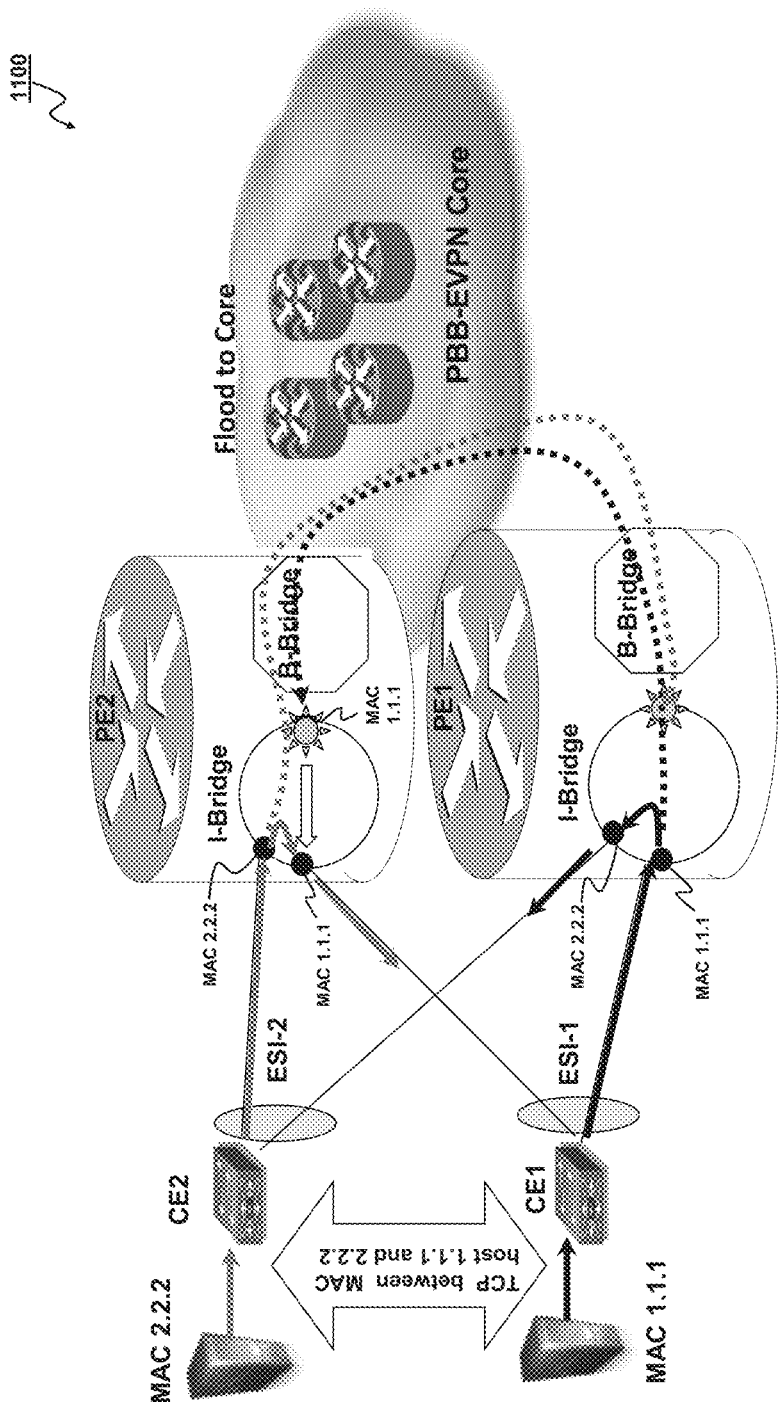
FIG. 11 illustrates an example of a steady state flow, according to some embodiments of the present disclosure.

As a result of implementing both the improved MAC address learning and MAC address flip-flopping reduction techniques described herein, in steady state (i.e. when both PE1 and PE2 have learned MAC 1.1.1 and MAC 2.2.2), traffic is unicast, as shown in FIG. 11.

Exemplary Devices

FIG. 12 illustrates an example network device 1200 suitable for implementing various embodiments of the present disclosure, e.g. embodiments related to assisting MAC address learning or/and embodiments related to ES-aware MAC learning. In various embodiments, the network device 1200 could be any one of or could be communicatively connected to in order to configure any one of the PE devices described herein, e.g. PE devices PE1 or PE2 shown in FIG. 1, with functionality described herein with reference to these devices.

As shown in FIG. 12, the network device 1200 includes a master central processing unit (CPU) 1210, interfaces 1220, and a bus 1230 (e.g., a PCI bus). When acting under the control of appropriate software or firmware, the CPU 1210 is responsible for executing packet management, error detection, and/or routing or forwarding functions. The CPU 1210 can accomplish all these functions under the control of software including an operating system and any appropriate applications software. CPU 1210 may include one or more processors 1214 such as a processor from the Motorola family of microprocessors or the MIPS family of microprocessors. In an alternative embodiment, processor 1214 is specially designed hardware for controlling the operations of network device 1200. In a specific embodiment, a memory 1212 (such as non-volatile RAM and/or ROM) also forms part of CPU 1210. However, there are many different ways in which memory could be coupled to the system.

The interfaces 1220 are typically provided as interface cards (sometimes referred to as "line cards"). Generally, they control the sending and receiving of data packets over the network and sometimes support other peripherals used with the network device 1200. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1210 to efficiently perform routing computations, network diagnostics, security functions, etc.

Although the system shown in FIG. 12 is one specific network device of the present disclosure, it is by no means the only network device architecture on which the present disclosure can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1212) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIGS. 13 and 14 illustrate example systems, according to some embodiments of the present disclosure. The more appropriate embodiment will be apparent to those of ordinary skill in the art when practicing the present technology. Persons of ordinary skill in the art will also readily appreciate that other system embodiments are possible.

Systems such as the ones shown in FIGS. 13 and 14 are also suitable for implementing various embodiments of the present disclosure, e.g. embodiments related to assisting MAC address learning or/and embodiments related to ES-aware MAC learning. In various embodiments, such systems could be any one of or could be communicatively connected to in order to configure any one of the PE devices described herein, e.g. PE devices PE1 or PE2 shown in FIG. 1, with functionality described herein with reference to these devices.

FIG. 13 illustrates a conventional system bus computing system architecture 1300 wherein the components of the system are in electrical communication with each other. Exemplary system 1300 includes a processing unit (CPU or processor) 1302, communicatively connected to a system bus 1306. The system bus 1306 couples various system components to the processor 1302, the system components including e.g. a system memory 1308, a read only memory (ROM) 1310, and a random access memory (RAM) 1312. The system 1300 can include a cache 1304 of high-speed memory connected directly with, in close proximity to, or integrated as part of the processor 1302. The system 1300 can copy data from the memory 1308 and/or the storage device 1314 to the cache 1304 for quick access by the processor 1302. In this way, the cache 1304 can provide a performance boost that avoids processor 1302 delays while waiting for data. These and other modules can control or be configured to control the processor 1302 to perform various actions. Other system memory 1308 may be available for use as well. The memory 1308 can include multiple different types of memory with different performance characteristics. The processor 1302 can include any general purpose processor and a hardware module or software module, such as module 1 1316, module 2 1318, and module 3 1320 stored in the storage device 1314, configured to control the processor 1302 as well as a special-purpose processor where software instructions are incorporated into the actual processor design. The processor 1302 may essentially be a completely self-contained computing system, containing multiple cores or processors, a bus, memory controller, cache, etc. A multi-core processor may be symmetric or asymmetric.

To enable user interaction with the computing device 1300, an input device 1322 can represent any number of input mechanisms, such as a microphone for speech, a touch-sensitive screen for gesture or graphical input, keyboard, mouse, motion input, speech and so forth. An output device 1324 can also be one or more of a number of output mechanisms known to those of skill in the art. In some instances, multimodal systems can enable a user to provide multiple types of input to communicate with the computing device 1300. The communications interface 1326 can generally govern and manage the user input and system output. There is no restriction on operating on any particular hardware arrangement and therefore the basic features here may easily be substituted for improved hardware or firmware arrangements as they are developed.

Storage device 1314 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1312, read only memory (ROM) 1310, and hybrids thereof.

The storage device 1314 can include software modules 1316, 1318, 1320 for controlling the processor 1302. Other hardware or software modules are contemplated. The storage device 1314 can be connected to the system bus 1306. In one aspect, a hardware module that performs a particular function can include the software component stored in a computer-readable medium in connection with the necessary hardware components, such as the processor 1302, bus 1306, display 1324, and so forth, to carry out the function.

FIG. 14 illustrates an example computer system 1400 having a chipset architecture that can be used in executing the described method and generating and displaying a graphical user interface (GUI). Computer system 1400 is an example of computer hardware, software, and firmware that can be used to implement the disclosed technology. System 1400 can include a processor 1402, representative of any number of physically and/or logically distinct resources capable of executing software, firmware, and hardware configured to perform identified computations. Processor 1402 can communicate with a chipset 1404 that can control input to and output from processor 1402. In this example, chipset 1404 outputs information to output 1406, such as a display, and can read and write information to storage device 1408, which can include magnetic media, and solid state media, for example. Chipset 1404 can also read data from and write data to RAM 1410. A bridge 1412 for interfacing with a variety of user interface components 1414 can be provided for interfacing with chipset 1404. Such user interface components 1414 can include a keyboard, a microphone, touch detection and processing circuitry, a pointing device, such as a mouse, and so on. In general, inputs to system 1400 can come from any of a variety of sources, machine generated and/or human generated.

Chipset 1404 can also interface with one or more communication interfaces 1416 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1402 analyzing data stored in storage 1408 or 1410. Further, the machine can receive inputs from a user via user interface components 1414 and execute appropriate functions, such as browsing functions by interpreting these inputs using processor 1402.

It can be appreciated that example systems 1300 and 1400 can have more than one processor 1302, 1402, or be part of a group or cluster of computing devices networked together to provide greater processing capability.

SELECTED EXAMPLES

Example 1 provides a computer-implemented method for assisting MAC address learning, the method including: receiving, at a first provider edge (PE) device (in the FIGs.: PE1), a data packet from a core network, the data packet identifying an Ethernet Segment (ES) from which the data packet originated and identifying a first media access control (MAC) address (MAC 1.1.1) as the destination MAC address; determining, at the first PE device, whether the first PE device has an Ethernet connection in the ES identified by the data packet (i.e. whether the first PE device has a local connection to the originating ES identified in the received data packet) and whether the first PE device has learned the first MAC address; upon positive determination (i.e. when both the identified ES is local to PE1 and PE1 has learned MAC 1.1.1), sending an announcement message to the core network, the announcement message identifying the first MAC address (MAC 1.1.1).

Example 2 provides the method according to Example 1, further including ensuring that other announcement messages identifying the first MAC address are not sent for a period of time following sending of said announcement message.

Example 3 provides the method according to Example 2, where the period of time is less than 2.5 minutes.

Example 4 provides the method according to any one of the preceding Examples, where said announcement message includes a field (Rest field) encoding a value (01) indicating that said announcement message is to be automatically dropped by PBB decapsulation procedure. (i.e. indicating that the announcement message is to be automatically dropped when a PE device processes the message).

Example 5 provides the method according to Example 4, where the value (01) indicating that the announcement message is to be automatically dropped by PBB decapsulation procedure indicates that the announcement message is not to be forwarded to any customer access edge (CE) devices.

Example 6 provides the method according to any one of the preceding Examples, where said announcement message includes a field (I-PCP field) encoding a value (110) indicating that the announcement message is to be given higher priority than data traffic.

Example 7 provides the method according to any one of the preceding Examples, where said announcement message includes a MAC announcement frame and its PBB-EVPN encapsulation header.

Example 8 provides a computer-implemented method for assisting Ethernet Segment (ES)-aware media access control (MAC) address learning, the method including: receiving, at a provider edge (PE) device, a data packet from a core network, the data packet identifying an ES from which the data packet originated and identifying a media access control (MAC) address as a source MAC address; determining, at the PE device, whether the PE device has an Ethernet connection in the ES identified by the data packet; and upon positive determination, associating, for traffic forwarding purposes, the MAC address identified as the source MAC address of the data packet to a bridge port, of the PE device (i.e. local bridge port), of the Ethernet connection in the ES identified by the data packet.

Example 9 provides the method according to Example 8, further including receiving, at the PE device, traffic destined to the MAC address, and forwarding, the PE device, the traffic to the MAC address via the bridge port of the Ethernet connection in the ES identified by the data packet.

Example 10 provides the method according to Example 9, where forwarding includes unicasting the traffic to the bridge port of the Ethernet connection in the ES identified by the data packet.

Example 11 provides the method according to any one of the preceding Examples, where the data packet includes an Ethernet frame.

Example 12 provides the method according to any one of the preceding Examples, where the core network includes a Provider Backbone Bridge (PBB) combined with Ethernet Virtual Private Network (EVPN) network.

Example 13 provides the method according to any one of the preceding Examples, where the PE device includes an all-active multi-homing PE device.

Example 14 provides the method according to any one of the preceding Examples, where determining whether the PE device has an Ethernet connection in the ES identified by the data packet includes determining, from a header of the data packet, a backbone MAC address (B-MAC) assigned to the ES.

Example 15 provides a system configured to carry out the method according to any one of the preceding Examples.

Example 16 provides a computer-readable storage medium, preferably non-transitory, encoding logic that include instructions for execution that, when executed by a processor, are operable to perform the method according to any one of the preceding Examples.

VARIATIONS AND IMPLEMENTATIONS

It is important to note that the steps in the appended diagrams illustrate only some of the possible signaling scenarios and patterns that may be executed by, or within, the network environment 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding example operations and use cases have been offered for purposes of example and discussion. Substantial flexibility is provided by the network environment 100 in that any suitable arrangements, chronologies, configurations, and timing mechanisms may be provided without departing from the teachings provided herein.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to assisting MAC address learning or/and to ES-aware MAC learning, described herein. This may be inclusive of appropriate algorithms and communication protocols that allow for the effective exchange of data or information.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A computer-implemented method for assisting Ethernet Segment (ES)-aware media access control (MAC) address learning, the method comprising:
   receiving, at a provider edge (PE) device, a data packet from a core network, the data packet identifying an ES from which the data packet originated and identifying a MAC address as a destination MAC address;
   determining whether the PE device has an Ethernet connection in the ES identified by the data packet; and
   upon a positive determination that the PE device has the Ethernet connection in the ES identified by the data packet, transmitting, via a data plane, an advertisement of the destination MAC address to other PE devices having an Ethernet connection in the ES identified by the data packet.

2. The method according to claim 1, further comprising:
   receiving, at the PE device, traffic destined to the destination MAC address, and
   forwarding, by the PE device, the traffic to the destination MAC address via a bridge port of the Ethernet connection in the ES identified by the data packet.

3. The method according to claim 2, wherein forwarding comprises unicasting the traffic to the bridge port of the Ethernet connection in the ES identified by the data packet.

4. The method according to claim 1, wherein the data packet comprises an Ethernet frame.

5. The method according to claim 1, wherein the core network comprises a Provider Backbone Bridge (PBB) combined with Ethernet Virtual Private Network (EVPN) network.

6. The method according to claim 1, wherein the PE device comprises an all-active multi-homing PE device.

7. The method according to claim 1, wherein determining whether the PE device has an Ethernet connection in the ES identified by the data packet comprises determining, from a header of the data packet, a backbone MAC address (B-MAC) assigned to the ES.

8. A system for assisting Ethernet Segment (ES)-aware media access control (MAC) address learning, the system comprising:
   at least one memory element configured to store computer executable instructions, and at least one hardware processor coupled to the at least one memory element and configured, when executing the instructions, to:
   receive, at a provider edge (PE) device, a data packet from a core network, the data packet identifying an ES from which the data packet originated and identifying a MAC address as a destination MAC address;
   determine whether the PE device has an Ethernet connection in the ES identified by the data packet; and
   upon a positive determination that the PE device has the Ethernet connection in the ES identified by the data packet, transmit, via a data plane, an advertisement of the destination MAC address to other PE devices having an Ethernet connection in the ES identified by the data packet.

9. The system according to claim 8, wherein the at least one hardware processor is further configured to:
   receive, at the PE device, traffic destined to the destination MAC address, and
   forward, by the PE device, the traffic to the destination MAC address via a bridge port of the Ethernet connection in the ES identified by the data packet.

10. The system according to claim 9, wherein forwarding comprises unicasting the traffic to the bridge port of the Ethernet connection in the ES identified by the data packet.

11. The system according to claim 8, wherein the data packet comprises an Ethernet frame.

12. The system according to claim 8, wherein the core network comprises a Provider Backbone Bridge (PBB) Ethernet Virtual Private Network (EVPN) network.

13. The system according to claim 8, wherein determining whether the PE device has an Ethernet connection in the ES identified by the data packet comprises determining, from a header of the data packet, a backbone MAC address (B-MAC) assigned to the ES.

14. One or more non-transitory tangible media encoding logic that include instructions for execution that, when executed by a processor, are operable to perform operations for assisting Ethernet Segment (ES)-aware media access control (MAC) address learning, the operations comprising:
   receiving, at a provider edge (PE) device, a data packet from a core network, the data packet identifying an ES from which the data packet originated and identifying a MAC address as a destination MAC address;
   determining whether the PE device has an Ethernet connection in the ES identified by the data packet; and
   upon a positive determination that the PE device has the Ethernet connection in the ES identified by the data packet, transmitting, via a data plane, an advertisement of the destination MAC address to other PE devices having an Ethernet connection in the ES identified by the data packet.

15. The media according to claim 14, wherein the operations further comprise:
   receiving, at the PE device, traffic destined to the destination MAC address, and
   forwarding, by the PE device, the traffic to the destination MAC address via a bridge port of the Ethernet connection in the ES identified by the data packet.

16. The media according to claim 15, wherein forwarding comprises unicasting the traffic to the bridge port of the Ethernet connection in the ES identified by the data packet.

17. The media according to claim 14, wherein the data packet comprises an Ethernet frame.

18. The media according to claim 14, wherein the core network comprises a Provider Backbone Bridge (PBB) Ethernet Virtual Private Network (EVPN) network.

19. The media according to claim 14, wherein the PE device comprises an all-active multi-homing PE device.

20. The media according to claim 14, wherein determining whether the PE device has an Ethernet connection in the ES identified by the data packet comprises determining, from a header of the data packet, a backbone MAC address (B-MAC) assigned to the ES.

\* \* \* \* \*